US005774614A

United States Patent [19]

Gilliland et al.

[11] Patent Number: 5,774,614

[45] Date of Patent: Jun. 30, 1998

[54] OPTOELECTRONIC COUPLING AND METHOD OF MAKING SAME

[76] Inventors: Patrick B. Gilliland, 5451 NE. River Rd., Chicago, Ill. 60656; James W. McGinley, 105 N. Summit Dr., Schaumburg, Ill. 60194; Roger E. Weiss, 10 Mary Way, Foxborough, Mass. 02035

[21] Appl. No.: 680,834

[22] Filed: Jul. 16, 1996

[51] Int. Cl.[6] .......... G02B 6/36

[52] U.S. Cl. .......... 385/88; 385/92; 385/94

[58] Field of Search .......... 385/88–94

[56] References Cited

U.S. PATENT DOCUMENTS

| | | | |
|---|---|---|---|
| 5,259,054 | 11/1993 | Benzoni et al. | 385/89 |
| 5,414,787 | 5/1995 | Kurata | 385/92 |
| 5,416,870 | 5/1995 | Chun et al. | 385/88 |
| 5,416,872 | 5/1995 | Sizer, II et al. | 385/92 |
| 5,420,954 | 5/1995 | Swirhun et al. | 385/92 |
| 5,428,704 | 6/1995 | Lebby et al. | 385/92 |
| 5,432,630 | 7/1995 | Lebby et al. | 359/152 |
| 5,446,814 | 8/1995 | Kuo et al. | 385/31 |
| 5,452,387 | 9/1995 | Chun et al. | 385/88 |
| 5,499,311 | 3/1996 | DeCusatis | 385/89 |
| 5,499,312 | 3/1996 | Hahn et al. | 385/91 |
| 5,515,467 | 5/1996 | Webb | 385/88 |
| 5,539,848 | 7/1996 | Galloway | 385/89 |
| 5,570,444 | 10/1996 | Janssen et al. | 385/88 X |
| 5,625,734 | 4/1997 | Thomas et al. | 385/88 |

*Primary Examiner*—Phan T.H. Palmer
*Attorney, Agent, or Firm*—David L. Newman

[57] ABSTRACT

An optoelectronic coupling is provided having an optoelectronic device such as a VCSEL attached to and aligned with a flexible substrate mounted to the end face of an optical waveguide between the optoelectronic device and the optical waveguide. The flexible substrate may provide the function of carrying components for controlling the optoelectronic device and may easily be oriented within the housing of an optoelectronic receptacle. A method of aligning the optoelectronic device with the optical fibers of the optical waveguide is provided via use of automatic alignment machinery.

20 Claims, 5 Drawing Sheets

OPTOELECTRONIC COUPLING AND METHOD OF MAKING SAME

BACKGROUND OF THE INVENTION

The present invention relates to an optoelectronic coupling and method of making the same and, in particular, an optoelectronic coupling which provides for a new and improved coupling for quickly and easily aligning a surface emitting laser to an optical waveguide.

The alignment of optoelectronic devices (e.g., LEDs, lasers) to waveguides have been accomplished in many different ways, including the etching of grooves in glass substrates for the placement of the optoelectronic device and the waveguide. The mounting of such optoelectronic devices on these rigid substrates such as silicon, require expensive and time-consuming techniques in order to place the optoelectronic device to the substrate and to form the grooves in the substrate to which the optoelectronic device is mounted. In other coupling assemblies, a fiber optic waveguide is plugged into a housing so that the end face of the waveguide or ferrule is abutting directly to the active area of the optoelectronic device. Such coupling methods requiring repeated insertions may cause damage to the optoelectronic device.

With the advances in the production abilities for surface emitting lasers, new arrangements are possible which allow for inexpensive and quickly assembled coupling assemblies. Due to the small size of optoelectronic devices and the use of optoelectronic arrays, it is possible to provide couplings which allow for passive and automatic alignment and flexible packaging orientations. Therefore, it is an object of the present invention to provide an optoelectronic coupling which provides for a quick and easy alignment of an optoelectronic device to an optical waveguide.

It is another object of the present invention to provide for a coupling which may be actively or passively aligned.

It is a further object of the present invention to provide for an optoelectronic coupling which provides for an optoelectronic device mounted in a flexible orientation.

It is another object of the present invention to provide an optoelectronic coupling wherein the optoelectronic device is movably and flexibly attachable to an optical waveguide.

It is a further object of the present invention to provide an optoelectronic coupling wherein the optoelectronic device is insulated from insertion forces by an intervening substrate.

It is a further object of the present invention to provide a method of coupling an optoelectronic device to an optical waveguide which provides for the quick and easy alignment of the optoelectronic device to the optical waveguide.

SUMMARY OF THE INVENTION

A principal object of this invention is to provide an optoelectronic coupling comprising a first substrate having an end face and an optical fiber mounted therein perpendicular to the end face, an optoelectronic device having a cavity therein and a first side being mounted to a second flexible substrate and the second flexible substrate mounted to the end face between the optoelectronic device and the first substrate wherein the cavity is aligned with the optical fiber. The cavity may emit light. The cavity may receive light. The optoelectronic device may be a VCSEL. The first substrate may form a first ferrule that is mounted in a housing having an alignment assembly for aligning the ferrule in the housing and for receiving a second ferrule of an external optical connector. The optoelectronic device may have a conductive member fiducially aligned with the cavity attached to the first side and being attached to solder pads on the second substrate wherein the solder pads are fiducially aligned to alignment points on the second substrate used to align the second substrate to fiducials on the first substrate. The second substrate may be a flexible and translucent material and include conductive traces adhered thereto for electrically connecting the optoelectronic device to other components. The second ferrule may be an MP connector. The second substrate may be a flexible film such as Kapton. The optoelectronic device may include a mounting member at a predetermined position corresponding to an alignment point on the second substrate. The first substrate may be an intermediate substrate mounted between the optoelectronic device and an optical connector.

A method of coupling an optoelectronic device forming a flexible substrate having conductive traces thereon and conductive pads aligned in predetermined positions, mounting an optoelectronic device to the flexible substrate wherein the optoelectronic device includes conductive members located in a predetermined position on a first side of the optoelectronic device and aligning the conductive members of the optoelectronic device to the conductive pads of the flexible substrate and mounting the flexible substrate to the end face of an optical waveguide wherein the flexible substrate is aligned to the end face of the optical waveguide via automatic alignment equipment. The method further including the steps of adhering epoxy to the end face of the optical waveguide and attaching the flexible substrate to the end face via the epoxy. The method wherein the epoxy and the flexible substrate have an index of refraction equal to the index refraction of the optical waveguide. The method wherein the optical waveguide is mounted within a housing for receiving an optical connector to abut against the second end of the optical waveguide. The method wherein the flexible substrate is arranged within a housing and exits through an aperture in the housing and the conductive traces of the flexible substrate may be electrically connected to an external component. The method of attaching the flexible substrate to the optical waveguide wherein light is transmitted through the optical device and through the optical waveguide in order to determine when the cavities of the optical waveguide are aligned with the corresponding optical fibers of the optical waveguide.

These and other features of the invention are set forth below in the following detailed description of the presently preferred embodiments.

DETAILED DESCRIPTION OF THE PRESENTLY PREFERRED EMBODIMENTS

The present invention relates to an optoelectronic coupling which is best understood with reference to FIGS. 1–6.

Figure 1:
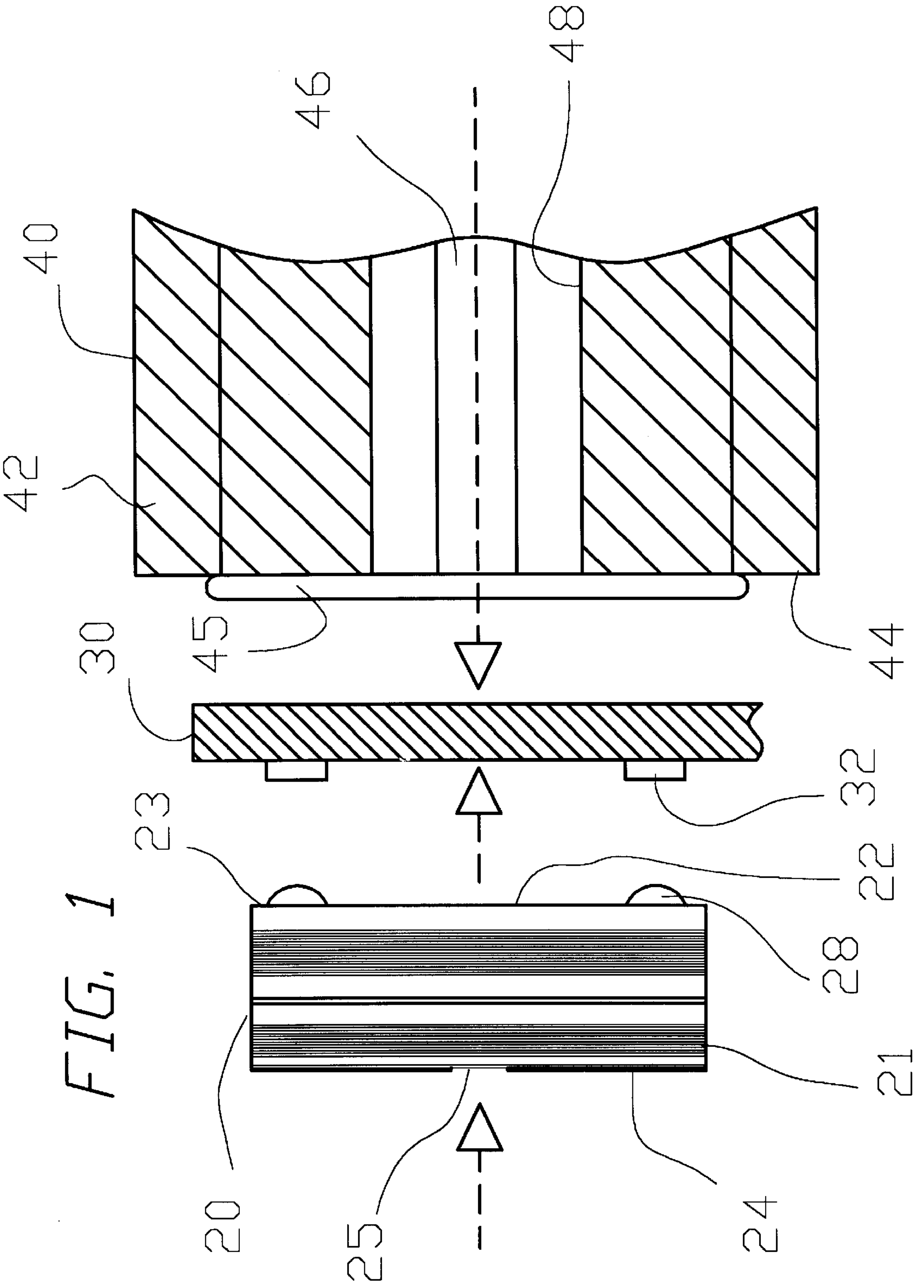
FIG. 1 is a side elevation cut-away view of the optoelectronic coupling of the present invention.

FIG. 1 is a side elevation cut-away view of an optoelectronic coupling 10. The coupling includes an optoelectronic device 20, a flexible substrate 30 and an optical waveguide 40. The optoelectronic device 20 may be a transmitter and/or a receiver. If the optoelectronic device 20 is a transmitter, it may include such devices as an LED or surface emitting lasers such as a vertical cavity surface emitting laser (VCSEL). If the optoelectronic device is a receiver, it may include such elements as a PIN diode. The optoelectronic device 20 may have a single transmission or receiving point or may have a plurality of transmission or receiving points. In such a case where a plurality of transmitting or receiving points are desired, the optoelectronic device may be an array. The optoelectronic device array may simultaneously transmit and receive having transmitter areas and also reception areas. The optoelectronic device array may have all transmitting areas or all receiving areas. The presently preferred embodiment depicted in FIG. 1 is a VCSEL having GaAs layers forming a Fabry-Perot cavity and an active side 23 having an active area 22 and an opposite second side 24. The optoelectronic device 20 includes a cavity 25 which goes through the optoelectronic device from the second side 24 to the active side 23. The optoelectronic device includes mounting means such as conductive members 28. The conductive members may be formed of any metallic material, such as solder. In a preferred embodiment, the conductive members 28 provide flip-chip technology for the optoelectronic device so that the optoelectronic device 20 may be surface mounted to a substrate 30. Light is transmitted or received at active area 22 on the active surface 23 on the optoelectronic device 20.

The flexible substrate 30 may be formed of any material which provides for a mounting surface for the optoelectronic device 20. In a preferred embodiment, a polyimide such as Kapton™(DuPont) is used having a thickness of 0.05 mm. The flexible substrate 30 allows for the substrate to be bendable and movable so that the coupling 20 may provide a compliant assembly as discussed below. The flexible substrate 30 is sufficiently flexible to provide for the quick and easy orientation of the substrate within a housing 70. The flexible substrate 30 in a preferred embodiment has conductive traces adhered thereto and solder pads 32 attached to the conductive traces. The solder pads 32 are located on the flexible substrate in predetermined positions according to the desired location of the optoelectronic device 20. The solder pads 32 are oriented corresponding to the conductive members 28 of the optoelectronic device 20 so that the optoelectronic device may be mounted in an orientation which is aligned to the optical waveguide 40. In a preferred embodiment, the flexible substrate 30 is sufficiently transparent or has an index of refraction which is well-matched to that of the optical fiber of the optical waveguide 40. The flexible substrate 30 may also include a circular aperture for coupling light from the VCSEL 20 to the optical waveguide 40.

Figure 2:
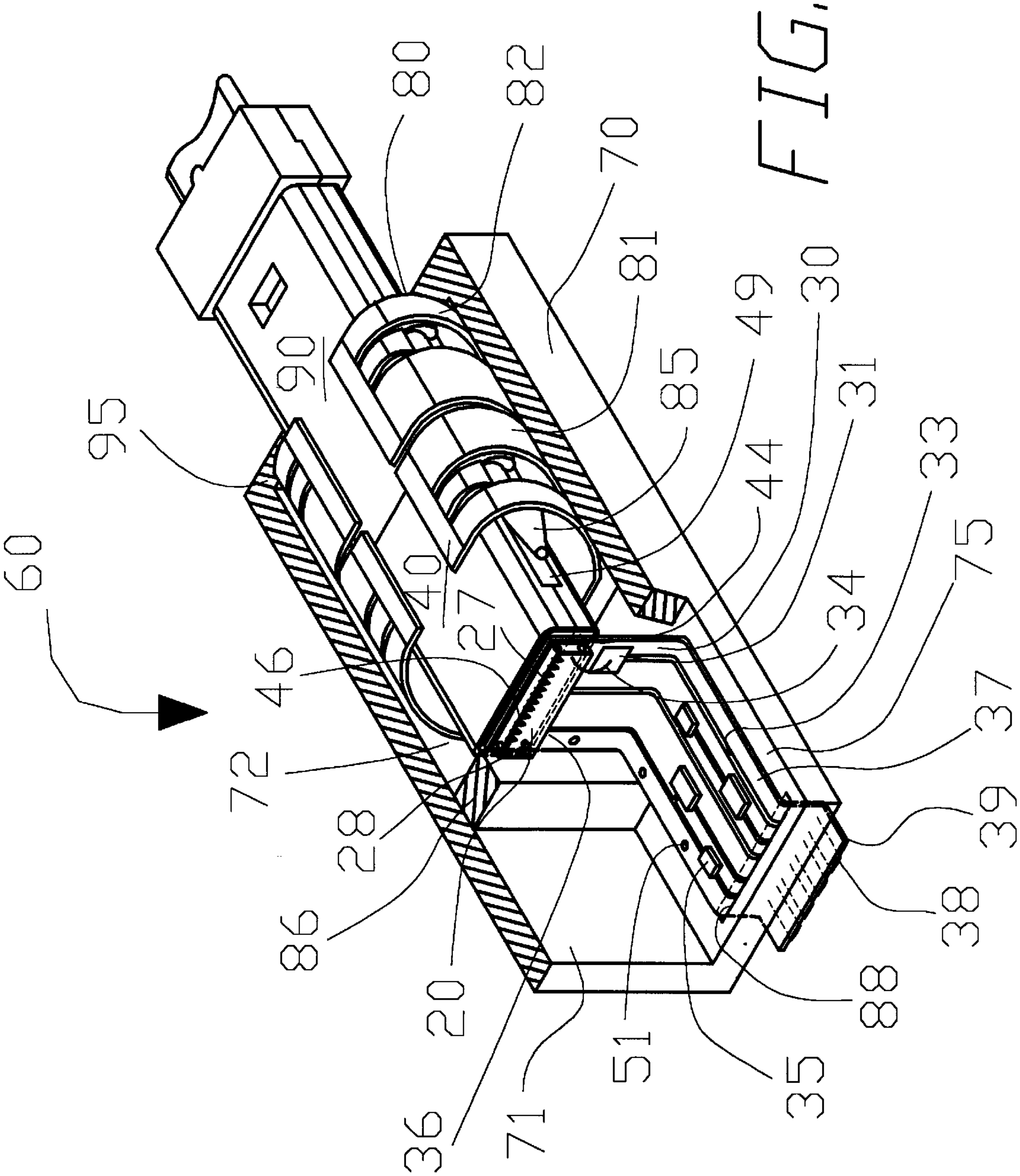
FIG. 2 is a perspective view of an optoelectronic receptacle including an optoelectronic coupling of the present invention.

The optical waveguide 40 includes a second substrate 42 having an end face 44 and an optical fiber 46 mounted within the second substrate 42 and perpendicular to the end face 44 In a preferred embodiment, the second substrate may be a glass material such as silicon or a polymer material such as liquid crystal polymer. The second substrate 42 has an aperture 48 formed therein through which the optical fiber 46 is mounted. The optical waveguide 40 may be formed according to known techniques of forming ferrules for optical connectors. The optical waveguide may include a single fiber 46 or multiple fibers as shown in FIG. 2. Such multiple fiber waveguides may include an MP connector manufactured by the assignee to the present application or having a single fiber such as an ST, SC or FC connector also manufactured by the assignee to the present invention. However, this optical waveguide 40, in a preferred embodiment, is an intermediate waveguide which allows for a standard fiber optic connector to be coupled to it in order to transmit or receive light waves to or from the optoelectronic device 20. The coupling 10 of the present invention provides for the optical fiber 46 of the optical waveguide 40 to be aligned with the active area 22 or cavity of the optoelectronic device 20.

A preferred method of assembling the coupling of the present device is provided as follows. An optoelectronic device 20 is provided having a cavity 25 oriented in a predetermined position having the active portion 22 formed by the cavity 25 at the active side 23 of the optoelectronic device 20. Conductive members 28 are adhered to the active side 23 in accordance with the position of the active area 22 and fiducially aligned with the cavity 25. A flexible substrate 30 is formed having a desired shape and having conductive traces adhered thereto and solder pads 32 formed thereon oriented corresponding to the conductive members 28 of the optoelectronic device 20. The optoelectronic device 20 is then mounted to the flexible substrate 30 using flip-chip technology via the exposure of heat to the optoelectronic device in order to in order to reflow the conductive members 28 and solder pads 32 to form a physical and electrical connection therebetween. The reflowing of the solder pads 32 and conductive members 28 will also act to align the optoelectronic device precisely at the predetermined position on the flexible substrate 30.

The solder pads 32 are oriented in relation to the external edges of the flexible substrate 30 which will be used in order to center and align the flexible substrate to alignment points on the end face 44 of the optical waveguide 40. Automatic assembly machinery is used in order to align the flexible substrate 30 to the end face 44 of the optical waveguide 40. For example, a conveyor system may be used to move the flexible substrate 30 having the optoelectronic device 20 mounted thereon in the X direction, while the optical waveguide 40 having the end face 44 exposed is moved in a Y direction. The incremental movement of the two pieces towards one another, allows for the automatic machinery to align the flexible substrate 30 in a predetermined position to alignment features on the end face 44 of the optical waveguide 40. The alignment features on the end face of the optical waveguide 40 are fiducially aligned to the optical fiber 46 mounted in the waveguide. Alternate systems may be used such as vision machinery in order to align the edges of the flexible substrate 30 to alignment points marked on the end face 44 of the optical waveguide 40. Once the flexible substrate 30 has been aligned in the predetermined position over the end face 44, the optical waveguide, epoxy 45 is applied to the end face 44. The flexible substrate 30 is then moved into contact with the epoxy 45 and the end face 44 of the optical waveguide 40, adhering the flexible substrate 30 thereto. In a preferred embodiment, the epoxy 45, the optical fiber 46 and the flexible substrate 30 all have a matched index of refraction of 1.5. However, the materials may have any index of refraction as long as they are similar, so that the transmission or reception of light waves through the optical fiber 46, epoxy 45 and flexible substrate 30 may occur with minimal signal loss. In this way, it may be understood that a quick and easy coupling 10 is provided and that the transmission or reception of light waves along the optical fiber 46 may be achieved having minimal signal loss. Further, in view of the embodiment discussed below, it may be understood that this coupling may be easily oriented within a housing to provide for attachment with other components and in order to form an optoelectronic receptacle.

Turning to FIG. 2, a perspective view of an assembly of an optoelectronic receptacle 60 is shown. Intermediate optical waveguide 40 is shown having end face 44 having flexible substrate 30 mounted thereto and an optoelectronic device 20 mounted to the flexible substrate 30. As discussed for FIG. 1 above, the mounting of the flexible substrate 30 to the end face 44 of the intermediate optical waveguide 40 is aligned so that the active areas of the optoelectronic device 20 are aligned with the optical fibers 46 of the intermediate waveguide 40 in order to transmit or receive light therethrough. The optoelectronic device 20 includes conductive members 28 which are attached to the solder pads mounted on the flexible substrate 30 which are located in predetermined positions in order to align the active areas of the optoelectronic device 20 to the optical fibers 46 of the intermediate optical waveguide 40.

This coupling is further assembled within an optoelectronic receptacle 60 in a preferred embodiment according to the following steps. A housing 70 is formed having a first cavity 71 and a second cavity 72. A base 75 of the housing 70 runs between the first cavity and second cavity 71,72. In a preferred embodiment the housing 70 is injection molded of a polymer material. Mounted in the second cavity 72 is an alignment assembly 80. The alignment assembly 80 provides for the coupling of the intermediate waveguide 40 with the waveguide of a fiber optic connector to be attached externally thereto. In a preferred embodiment, the alignment assembly 80 includes a first alignment sleeve half 81 and a second alignment sleeve half 82. Running between the first alignment sleeve half 81 and the second alignment sleeve half 82 is an alignment member such as a pin 85. The alignment member 85 is shaped in order to align with a groove 49 formed in the side of the intermediate optical waveguide 40 and the external optical waveguide 90. In such a way, the alignment of the intermediate optical waveguide 40 with the external optical waveguide 90 of an optical connector is accomplished. This alignment is described in more detail in co-pending application Ser. No. 08/577,508, filed Dec. 22, 1995. A pair of end walls 86,95 are formed in order to retain the alignment assembly 80 within the second cavity 72 of the housing 80. The preferred embodiment shown in FIG. 2 discloses an MP optical connector having multiple fibers therein and having a rectangular-shaped ferrule or external optical waveguide 90, which is matable with the alignment assembly 80. However, other optical waveguides commonly known may be mated to the optoelectronic receptacle 60 as well. The intermediate optical waveguide 40 may have varying orientations and an alignment assembly 80 may also be altered to receive variously configured optical waveguides and connectors such as MT, MAC or MTP multi-fiber connectors. Further, and as discussed below, the present invention may provide for the reception of simplex or duplex fiber optic connectors using the same coupling 10 of the present invention.

After assembly of the coupling 10, the intermediate optical waveguide 40 is mounted within the alignment assembly 80 by inserting the second substrate 42 within the first alignment sleeve half 81 so that the alignment member 85 aligns with the groove 49. The intermediate waveguide 40 is mounted so that its end face 44 abuts against abutment member 86 of the housing 80. The abutment member 86 retains the intermediate waveguide 40 within the second cavity 72 and upon insertion of an external optical waveguide 90, prohibits the intermediate optical waveguide 40 from being forced backwards into the first cavity 71. In an alternate embodiment, a resilient member such as a spring may be placed between the end face 44 and the abutment member 86 in order to provide resiliency of the intermediate optical waveguide 40 upon the insertion of an external optical waveguide 90 within the second cavity 72 of the optoelectronic receptacle 60.

The flexible substrate 30 is formed having conductive traces 33 formed thereon and mounted on the traces 33 are components 35. The components 35 may include capacitors, resistors or ICs to perform certain functions related to the optoelectronic device. For example, in a preferred embodiment, the optoelectronic device 20 may be a VCSEL and there may be desired a component 35 such as a CMOS gate circuit in order to control the VCSEL. The flexible substrate 30 may have conductive traces on both surfaces of the substrate and vias within the substrate in order to transmit signals from one side to the other. Conductive traces 38 may be formed on the bottom side substrate and the substrate may be threaded through aperture 88 of the housing so that the conductive areas 38 are exposed and are parallel to the base 75 of the optoelectronic receptacle 60. In this orientation, the conductive areas 38 are facing downward and may be easily surface mounted to an external unit such as a motherboard of a device such as a computer server. Therefore, it may be understood that the flexible substrate 30 performs multiple functions including the attachment point for the optoelectronic device 20, an alignment means for alignment to the end face 44 of the optical waveguide 40, a circuit board for carrying signals to and from the optoelectronic device 20 and also providing an electrical connector having conductive areas 38 for the mounting of the optoelectronic receptacle 60. The terminal portion 39 of the flexible substrate 30 may also be inserted within a shroud of an electrical connector in order to provide for a ribbon-style connector for the removable connection of the optoelectronic receptacle 60. The conductive traces 33 may also be used to carry power from an external device to the optoelectronic device 20 via pad 31 which is attached via a wire bond 34 to a metallized layer 27 of the optoelectronic device 20 in order to provide power thereto. In an alternate embodiment, the flexible substrate 30 may be multi-layered and/or may include a ground plane.

The flexible substrate 30 is oriented having a terminal portion 39 protruding from the housing 80 of the optoelectronic receptacle 60, a central portion 37 which is oriented parallel to the base 75 of the housing 70 and an alignment portion 36 which is perpendicular to the base 75 of the housing and parallel to the end face 44 of the intermediate waveguide 40. This is the arrangement of the flexible substrate 30 according to a preferred embodiment, however, other arrangements of the flexible waveguide may be achieved due to its flexibility and its easily formable characteristics. It may be understood that due to the flexible nature of the substrate 30, the intermediate waveguide 40 having the flexible substrate 30 mounted thereto, may move axially or laterally within the second cavity 72, without stressing the coupling between the optoelectronic device 20 and the flexible substrate 30 or between the flexible substrate and the intermediate optical waveguide 40. The flexible substrate 30 is formed of a material having sufficient elasticity to take up any forces due to movement of the optical waveguides 40,90. In addition, the central portion 37 of the flexible substrate 30 may have sufficient slack provided in order to allow limited movement of the alignment portion 36. In a preferred embodiment, the flexible substrate 30 includes guide holes 51 which provide for the alignment of the flexible substrate 30 when it is placed on the automatic conveyor system prior to mounting within the optoelectronic receptacle 60. As discussed above, the coupling 10 is formed by moving the flexible substrate 30 into a predetermined position over the end face 44 of the intermediate optical waveguide 40. The automatic assembly equipment may includes tapered pins which protrude through the alignment holes 51 of the flexible substrate 30 in order to locate the substrate and move it into its desired position.

Figure 3:
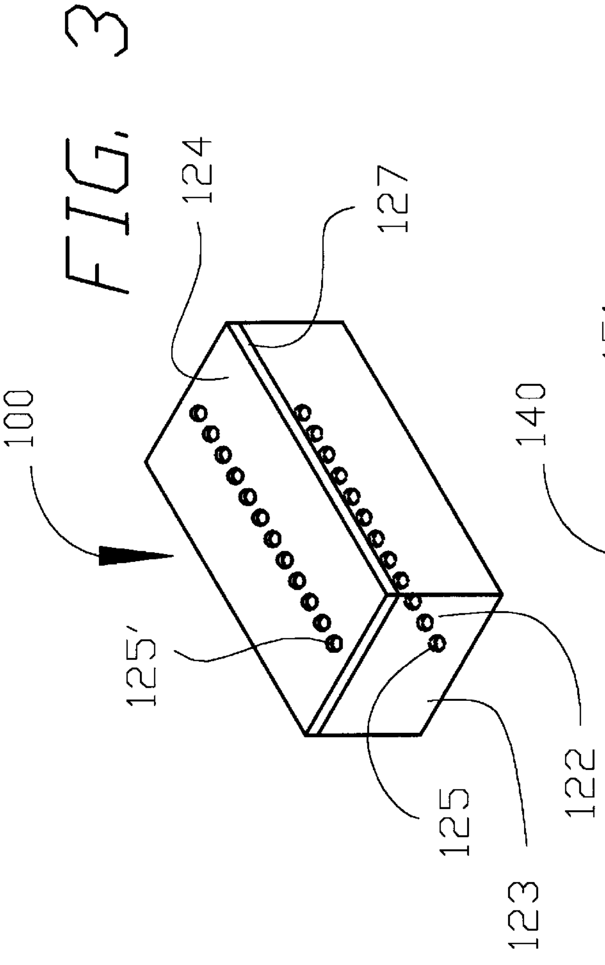
FIG. 3 is a perspective view of an embodiment of an optoelectronic device of the present invention.

Turning to FIG. 3, a perspective view of an embodiment of an optoelectronic device 100 is shown. The optical device 100 includes an active side 123 and an opposite second side 124. In the embodiment of the optoelectronic device 100, an array of transmitters and/or receivers are aligned along the length of the optoelectronic device 100 forming an active area 122 having an array of cavities 125 running along the length of the optoelectronic device 100. The cavities 125 include an opening at the active side 123 and a corresponding opening for each cavity 125 at the second side 124. Each cavity 125 may either transmit or receive lightwaves. In a preferred embodiment, the optoelectronic device 100 is a VCSEL for transmitting lightwave signals. The second end 124 includes a metallized layer 127 which provides for an attachment surface for external components such as a power source for the optoelectronic device 100. The metallized layer 127 also encloses the optoelectronic device 100 and may provide for a reflective surface for internal reflections in order to provide the lasing feature of the optoelectronic device 100. In the embodiment shown in FIG. 3, the metallized layer 127 includes corresponding cavities 125' to the cavity 125 formed within the optoelectronic device 100. The cavity 125' at the second side 124 of the optoelectronic device 100 may be used in order to aid in the alignment of the optoelectronic device to the coupling 10 described above for FIG. 1. In another method of providing the coupling of the present invention, the optoelectronic device 100 may be moved into a position via an automatic conveyor system and a light source may be positioned adjacent the second side 124. The light source may cause light to be transmitted through the cavities 125', 125 and through the flexible substrate 30 and into and through the optical fiber 46 of the optical waveguide 40. The optical waveguide may be adjacent to a light measuring and detecting means. Upon the proper alignment of each of the cavities 125 with each of the optical fibers 46, an appropriate reading will be achieved indicating the alignment of the cavities 125 with the optical fibers 46. As shown in FIG. 3, each cavity 125 of the optical device 100 includes a corresponding cavity 125' in the metallized layer 127 on the second side 124 of the optoelectronic device 100. Thus, each cavity 125 may be measured and checked for the proper alignment by measuring the transmission loss of the light source located adjacent to the second side 124. In an alternate method of aligning the coupling 10, the light source may be located adjacent the optical waveguide 40 and the measuring instrument may be located adjacent the second side 124 of the optoelectronic device. This passive alignment method does not require the powering-up of the optoelectronic device 100 in order to provide for alignment. However, an alternate method of aligning the optoelectronic device may be accomplished without use of an external light source as discussed above. Where it is not disadvantageous to do so, the optoelectronic device 100 may be powered-up in order to transmit light signals from the cavities 125 in order to provide alignment with the optical fibers 46 in the optical waveguide 40.

Figure 4:
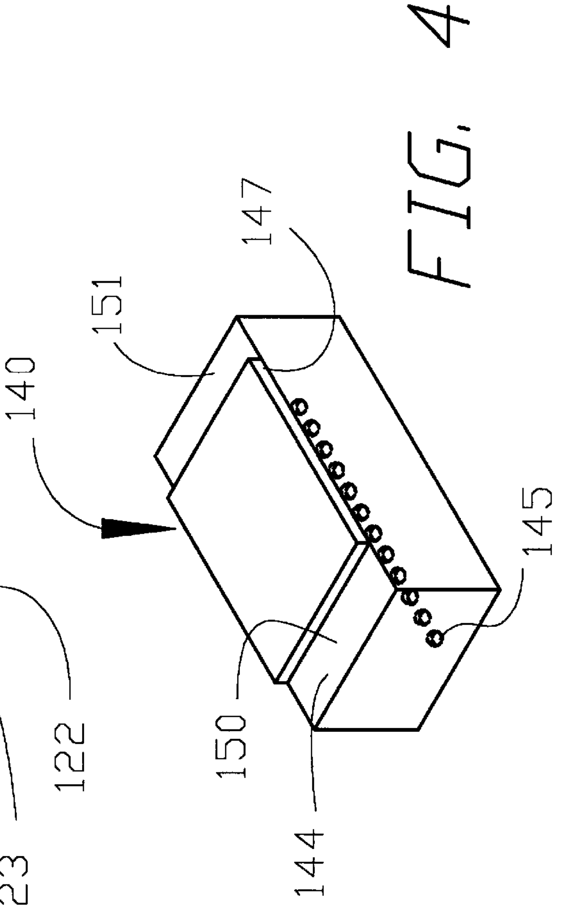
FIG. 4 is a perspective view of another embodiment of an optoelectronic device of the present invention.

FIG. 4 discloses a further alternate embodiment of an optoelectronic device 140 The second side 144 of the optoelectronic device 140 includes open areas 150,151 which do not have a metallized layer 147. The open areas 150,151 are located over at least one cavity 145 at each end of the optoelectronic device 140. The material of the optoelectronic device 140 forming the second side 144 allows for the transmission of light waves through the second side 140 and into the cavity 145 running through the interior of the optoelectronic device 140. Therefore, similar to the method of alignment discussed for FIG. 3, the open areas 150,151 allow for the transmission of light through the second side 144 and through the cavities 145 in order to provide alignment of at least the first and last cavities 145 in the array of the optoelectronic device 140. This orientation does not allow for the measuring of the transmission of light through each cavity in the array of the optical device 140, but does provide for the alignment of at least the first and last cavities 145 in order that the optoelectronic device 140 may be aligned to a flexible substrate 30 and an optical waveguide 40 as discussed above. In most circumstances, the alignment of the first and last cavity 145 will also align the cavities therebetween having predetermined spacings corresponding to the spacings of the optical fibers of the optical waveguide to be attached to.

Figure 5:
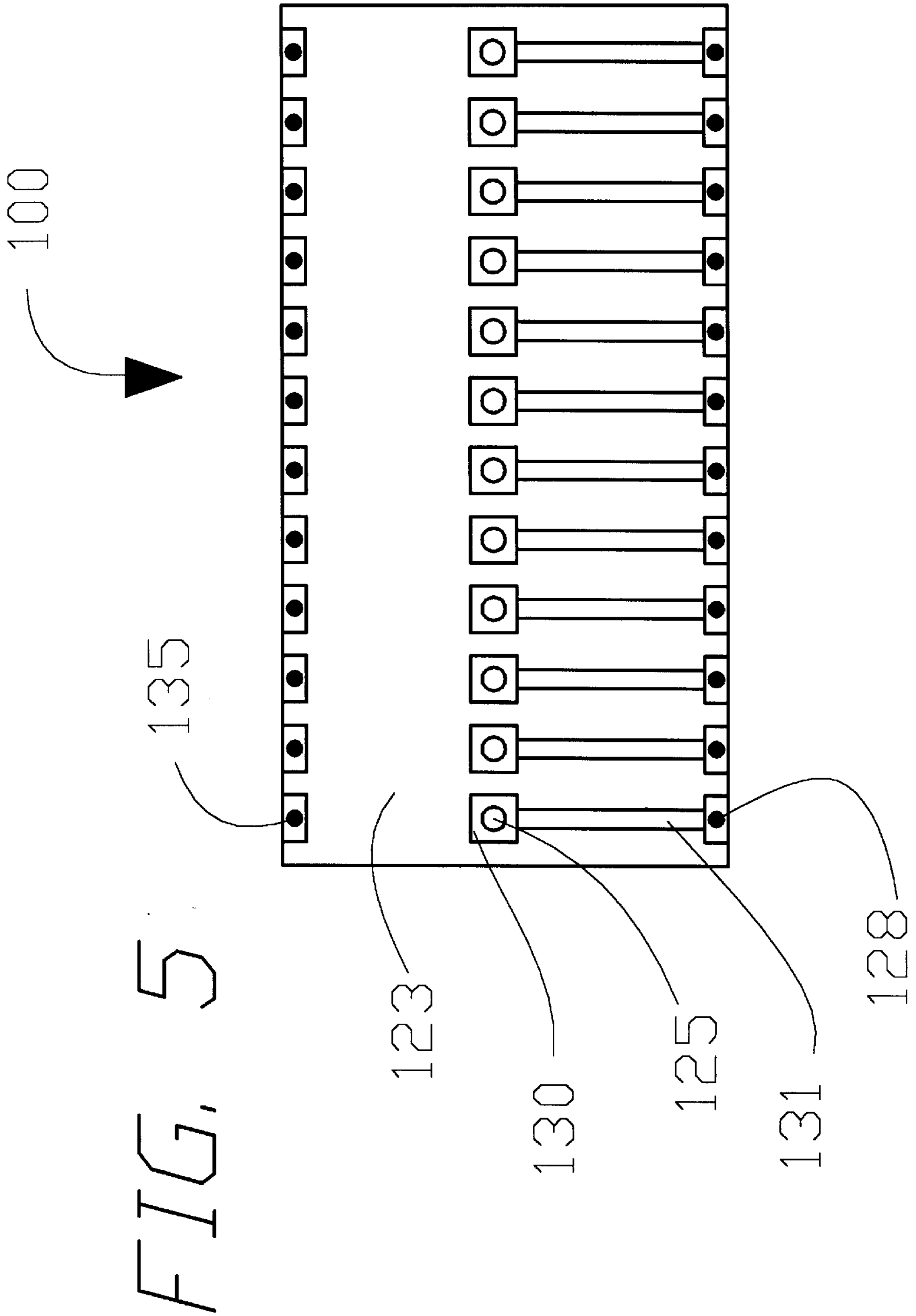
FIG. 5 is a plan view of the active surface of an embodiment of an optoelectronic device of the present invention.

Turning to FIG. 5, a plan view of the active side 123 of an optoelectronic device 100 is shown. An array of cavities 125 are shown aligned along the length of the optoelectronic device and in the preferred embodiment of the optoelectronic device 100 being a VCSEL, the cavities act as the active area at which light is transmitted. Each cavity 125 is surrounded by a conductive pad 130 which surrounds the cavity 125 at the active side 123. The conductive pad 130 is connected via a conductive trace 131 which is connected to a conductive member 128. In a preferred embodiment, the conductive member may be a solder ball according to known flip-chip technology and provides for the mounting of the optoelectronic device 100 to the flexible substrate 30 as discussed above. In a preferred embodiment, the conductive member 128 carries electrical signals from the flexible substrate along the conductive trace 131 to the conductive pad 130 in order to control the signal transmission of the cavity 125 via electric current. The conductive member 128 is also oriented in a predetermined position according to the location of the cavity 125 in order that mechanical alignment of the optical device 100 is achieved onto the flexible substrate providing for the alignment of the cavities 125 to the optical fibers as discussed above. The active side 123 may also have conductive member 135 attached thereto in order to provide for a second mechanical attachment means of the optoelectronic device to form a secure mounting of the optoelectronic device to a substrate.

Figure 6:
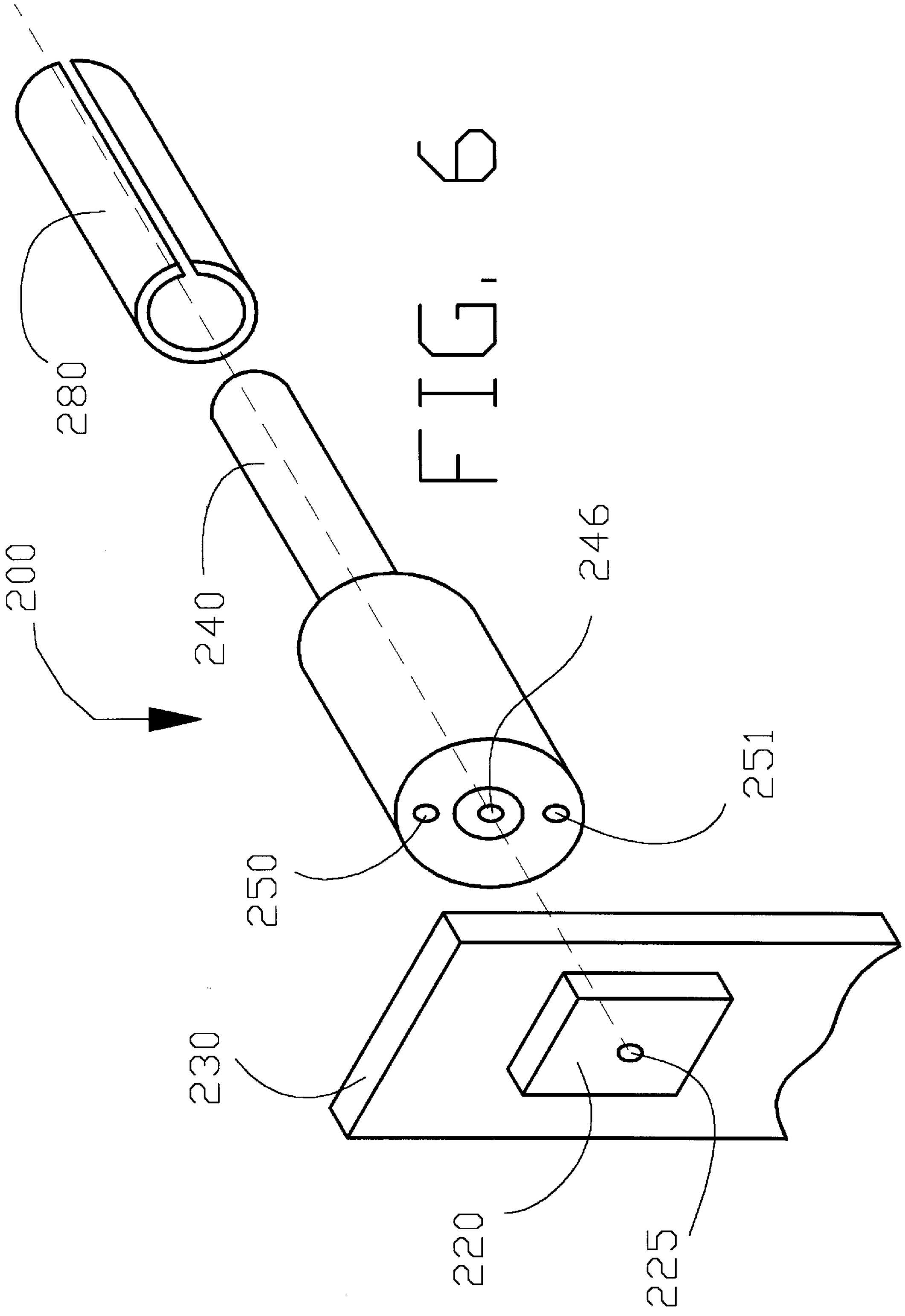
FIG. 6 is a perspective exploded view of another embodiment of the optoelectronic coupling of the present invention.

Turning to FIG. 6, an alternate embodiment of a coupling 200 is shown. This optoelectronic coupling 200 discloses a simplex device such as a ST optical connector having an optical waveguide ferrule 240. The ferrule 240 may have an outer housing 270 surrounding the ferrule 240. Inserted within the ferrule and concentrically oriented therein is an optical fiber 246. Mounted at the end face 244 of the housing 270 are alignment members 250,251. In a preferred embodiment, alignment members 250,251 may be fiducials for alignment to conductive pads mounted on flexible substrate 230. Mounted to the flexible substrate 230 is an optoelectronic device 220 such as a VCSEL having a single cavity 225 which is mounted to the flexible substrate 230 as discussed above using similar alignment techniques. The flexible substrate 230 is then mounted to the end face 244 of the housing 270 in order to align the cavity 225 with the optical fiber 246. In such a method of providing an optoelectronic coupling 200, it may be understood that the present method may be used for a single or simplex device, a duplex optical connector or multi-fiber optical connectors. A coupling sleeve 280 may be placed over the ferrule 240 for the reception of a mating simplex optical connector at the other end of the coupling sleeve 280.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An optoelectronic coupling comprising:

A first ferrule having an end face and an optical fiber mounted therein perpendicular to the end face, the first ferrule having an alignment groove at a side;

a housing having an alignment assembly mounted therein including an alignment member for abutting against the alignment groove of the first ferrule and aligning the first ferrule within the housing;

a second optical ferrule of an external optical connector mounted in the housing and abutting the first optical ferrule within the alignment assembly;

an optoelectronic device having a cavity therein and an active side being mounted to a flexible substrate; and the flexible substrate mounted to the end face between the optoelectronic device and the optical ferrule wherein the cavity is aligned with the optical fiber.

2. The optoelectronic coupling of claim 1 wherein the cavity emits light.

3. The optoelectronic coupling of claim 1 wherein the cavity receives light.

4. The optoelectronic coupling of claim 1 wherein the optoelectronic device is a VCSEL.

5. The optoelectronic coupling of claim 1 wherein the housing forms a cavity surrounding the first and second ferrules, the alignment assembly and the flexible substrate.

6. The optoelectronic coupling of claim 1 wherein the optoelectronic device includes a conductive member fiducially aligned with the cavity attached to the active side and being attached to solder pads on the flexible substrate wherein the solder pads are fiducially aligned to alignment points on the flexible substrate used to align the flexible substrate to fiducials on the optical waveguide.

7. The optoelectronic coupling of claim 1 wherein the flexible substrate is a nonconductive material and includes conductive traces adhered thereto for electrically connecting the optoelectronic device to other components.

8. The optoelectronic coupling of claim 1 wherein the ferrule is an MP connector ferrule.

9. The optoelectronic coupling of claim 1 wherein the flexible substrate is a film having sufficient transparency.

10. The optoelectronic coupling of claim 1 wherein the flexible substrate is made of polyimide.

11. The optoelectronic coupling of claim 1 wherein the optoelectronic device includes a mounting member at a predetermined position corresponding to the alignment point on the flexible substrate.

12. The optoelectronic coupling of claim 1 wherein the optical waveguide is an intermediate waveguide mounted between the optoelectronic device and an externally mounted optical connector.

13. A method of forming an optoelectronic coupling including the steps of:

forming a flexible substrate having conductive traces thereon and conductive pads aligned in predetermined positions:

mounting an optoelectronic device to the flexible substrate wherein the optoelectronic device includes conductive members located in a predetermined position on a first side of the optoelectronic device;

aligning the conductive members of the optoelectronic device to conductive pads of the flexible substrate; forming a housing of a molded polymer material having an alignment assembly mounted therein having an alignment member;

mounting an optical waveguide within the alignment assembly and a side of the optical waveguide engaging the alignment member; and mounting the flexible substrate to an end face of the optical waveguide wherein the flexible substrate is aligned to the end face of the optical waveguide automatically.

14. The method of claim 13 further including the steps of:

adhering adhesive to the end face of the optical waveguide and attaching the flexible substrate to the end face via the adhesive.

15. The method of claim 13 wherein the adhesive and the flexible substrate have an index of refraction nearly equal to the index of refraction of the optical waveguide.

16. The method of claim 13 wherein the optical waveguide is mounted within a housing for receiving an optical connector to abut against the second end of the optical waveguide.

17. The method of claim 13 wherein the flexible substrate is arranged within a housing and exits through an aperture in the housing and the conductive traces of the flexible substrate may be electrically connected to an external component.

18. The method of claim 13 wherein light is transmitted through the optical device and through the optical waveguide to determine when the cavities of the optical waveguide are aligned with the corresponding optical fibers of the optical waveguide.

19. The method of claim 13 wherein the flexible substrate is aligned to the end face of the optical waveguide via automatic alignment equipment.

20. The method of claim 13 wherein the optoelectronic device is a VCSEL.

* * * * *